US009256563B2

(12) United States Patent
Ting

(10) Patent No.: US 9,256,563 B2
(45) Date of Patent: Feb. 9, 2016

(54) DUAL-OPERATING-SYSTEM ARCHITECTURE FOR SHARING USB DEVICES, AND METHOD THEREOF

(71) Applicant: WISTRON CORP., New Taipei (TW)

(72) Inventor: Tung-Sheng Ting, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/020,601

(22) Filed: Sep. 6, 2013

(65) Prior Publication Data

US 2014/0122749 A1 May 1, 2014

(30) Foreign Application Priority Data

Oct. 25, 2012 (TW) ............... 101139411 A

(51) Int. Cl.
| | |
|---|---|
| *G06F 3/00* | (2006.01) |
| *G06F 13/00* | (2006.01) |
| *G06F 13/12* | (2006.01) |
| *G06F 13/20* | (2006.01) |
| *G06F 13/40* | (2006.01) |
| *G06F 13/38* | (2006.01) |

(52) U.S. Cl.
CPC .......... *G06F 13/4022* (2013.01); *G06F 13/385* (2013.01)

(58) Field of Classification Search
CPC ....... G06F 13/10; G06F 13/14; G06F 13/385; G06F 13/4022
USPC ............... 710/11, 14, 313, 110, 8, 31, 33, 62; 455/566; 719/319, 327
See application file for complete search history.

(56) References Cited

U.S. PATENT DOCUMENTS

| | | | |
|---|---|---|---|
| 6,799,202 B1 * | 9/2004 | Hankinson | G06F 9/50 709/203 |
| 2007/0152807 A1 * | 7/2007 | Huang et al. | 340/521 |
| 2007/0245057 A1 * | 10/2007 | Bohm et al. | 710/313 |
| 2007/0245058 A1 * | 10/2007 | Wurzburg et al. | 710/313 |
| 2009/0058887 A1 | 3/2009 | Lin | |
| 2009/0059965 A1 | 3/2009 | Lin et al. | |
| 2009/0061838 A1 | 3/2009 | Lin | |
| 2009/0064186 A1 | 3/2009 | Lin | |
| 2009/0064195 A1 * | 3/2009 | Chin et al. | 719/319 |
| 2009/0113458 A1 * | 4/2009 | Finger et al. | 719/327 |
| 2011/0265183 A1 * | 10/2011 | Wu | G06F 9/4401 726/24 |
| 2012/0005691 A1 * | 1/2012 | Wong et al. | 719/319 |
| 2013/0072260 A1 * | 3/2013 | Nair et al. | 455/566 |
| 2013/0268697 A1 * | 10/2013 | Lambert et al. | 710/11 |
| 2014/0089543 A1 * | 3/2014 | Creager et al. | 710/110 |

FOREIGN PATENT DOCUMENTS

| | | | |
|---|---|---|---|
| CN | 102081553 A | 6/2011 | |
| TW | 201011634 A | 3/2010 | |

OTHER PUBLICATIONS

Taiwan Patent Office, Office Action, Patent Application Serial No. 101139411, Jul. 15, 2014, Taiwan.

* cited by examiner

*Primary Examiner* — Farley Abad
*Assistant Examiner* — Henry Yu

(57) ABSTRACT

A dual-operating-system architecture for sharing USB apparatus in provided. The apparatus includes: a first operating system; a second operating system; a USB hub, connected to at least one USB apparatus; and a switch, for disconnecting the first operating system from the USB hub and connecting the second operating system to the USB hub for gaining control over the at least one USB apparatus when the first operating system is switched to the second operating system.

7 Claims, 5 Drawing Sheets

DUAL-OPERATING-SYSTEM ARCHITECTURE FOR SHARING USB DEVICES, AND METHOD THEREOF

CROSS REFERENCE TO RELATED APPLICATIONS

This non-provisional application claims priority under 35 U.S.C. §119(a) on Patent Application No(s). 101139411, filed in Taiwan, Republic of China on Oct. 25, 2012, the entire contents of which are hereby incorporated by reference.

BACKGROUND OF THE INVENTION

1. Field of the Invention

The present invention relates to dual-operating-system architectures, and in particular to techniques for the dual-operating-system architectures to share USB devices.

2. Description of the Related Art

Portable electronic devices, such as notebook computers and smartphones, have become indispensable for modern-day humans.

Conventionally, the operating system (OS) which is most widely used in electronic devices is the Microsoft Windows OS. Nowadays, however, the Android OS, which is based on a Linux OS, is also popular. The two operating systems perform differently with different operations. In order to take advantage of both OSs, some designs integrate the two OSs into a single electronic device. In some designs, the electronic device has only one CPU to process instructions for dual OSs, while in some other designs, separate CPUs are respectively in charge of one of the OSs. Generally, in a dual OS architecture, only one of the OSs will be in operation while the other will remain in a sleep state at the same time. In this manner, the dual OSs can share resources and unnecessary conflicts can be prevented.

Ideally, in order to reduce configuration costs and enhance usage convenience, the two OSs should be able to share all peripheral devices and avoid any duplicate device.

BRIEF SUMMARY OF THE INVENTION

The present invention provides a dual-operating-system architecture for sharing USB apparatus, comprising: a first operating system; a second operating system; a USB hub, connected to at least one USB apparatus; and a switch, for disconnecting the first operating system from the USB hub and connecting the second operating system to the USB hub for gaining control over the at least one USB apparatus when the first operating system is switched to the second operating system.

The present invention also provides a method for a dual-operating-system architecture to share USB devices, wherein the dual-operating-system architecture comprises a first operating system and a second operating system, and the two operating systems are connected to each other, the method comprising the steps of: providing a USB hub to connect to at least one USB apparatus; providing a switch to connect to the USB hub, the first operating system, and the second operating system; disconnecting the first operating system from the USB hub and connecting the second operating system to the USB hub to make the second operating system gain control over the USB apparatus(es) when the first operating system is switched to the second operating system.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Most peripheral devices can communicate with a host computer via a USB interface, and therefore the present invention provides a dual-operating-system architecture that can share USB devices.

Dual-Operating-System Architecture Sharing USB Devices

Figure 1A:
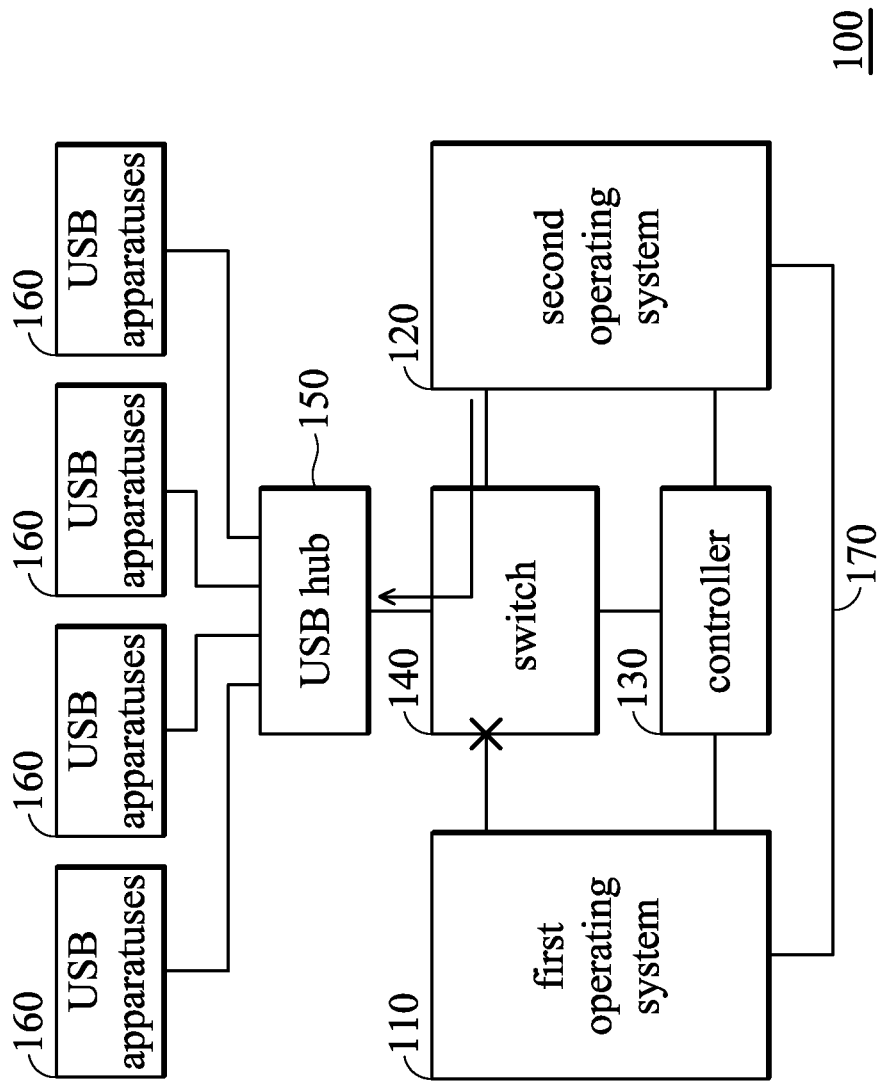
FIGS. 1A and 1B show an electronic device which operates dual operating systems according to an embodiment of the present invention.
Figure 1B:
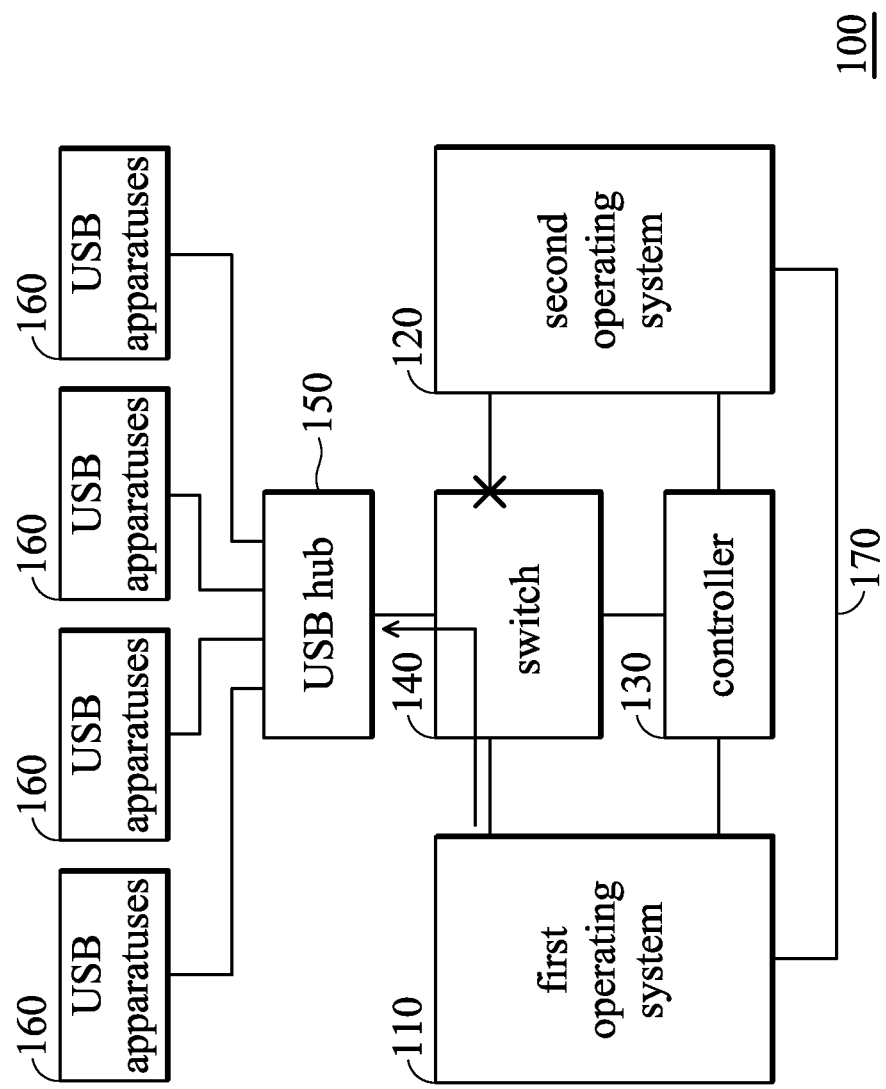

FIGS. 1A and 1B show an electronic device which operates dual operating systems according to an embodiment of the present invention. The electronic device 100 of the present invention can be a notebook computer or a smartphone, which comprises: a first operating system 110, a second operating system 120, a controller 130 and a switch 140, a USB hub 150 and a plurality of USB apparatuses 160. For example, the first operating system 110 can be a Windows operating system, and the second operating system 120 can be an Android operating system. However, the present invention is not limited to this example, and can be applied to various operating systems. The USB hub 150 of the present invention can be connected to a plurality of USB devices 160, such as keyboards, mouse devices, touchpads, trackballs, trackpoints, displays, speakers, headsets, cameras, card readers, and network devices (not shown in detail in FIGS. 1A and 1B).

The controller 130 of the present invention, for example, is an independent embedded controller (EC). The controller 130 is coupled to the two operating systems 110 and 120 and the switch 140, and is used to control the switch according to commands from the operating systems 110 and 120. Note that the switch 140 under the control of the controller 130 can switch from the first operating system 110 (e.g., Windows) to the second operating system 120 (e.g., Android) so as to connect the second operating system 120 to the USB hub 150, and disconnect the first operating system 110 from the USB hub 150, thereby enabling the second operating system 120 to control the USB devices 160 via the USB hub 150, and preventing interference and conflicts due to commands from the first operating system 110, as shown in FIG. 1A. Similarly, when the second operating system 120 (i.e., Android) switches back to the first operating system 110 (i.e., Windows), the switch 140 re-connects the first operating system 110 to the USB hub 150, and disconnects the second operating system 120 from the USB hub 150, as shown in FIG. 1B.

In order to prevent conflicts between the operating systems, in a preferred embodiment, the controller 130 further sets the second operating system 120 to be in a host mode, and the first operating system 110 to be in a client mode when the first operating system 110 is switched to the second operating system 120. Alternatively, when the second operating system 120 is switched to the first operating system 110, the controller 130 further sets the first operating system 110 to be in a host mode, and the second operating system 120 to be in a client mode. The controller 130 of the present invention, for example, can perform the setting via the transmission interface 170 or a specific ID pin. As such, the operating system in the host mode can control the operating system in the client mode as its other apparatus.

Figure 1C:
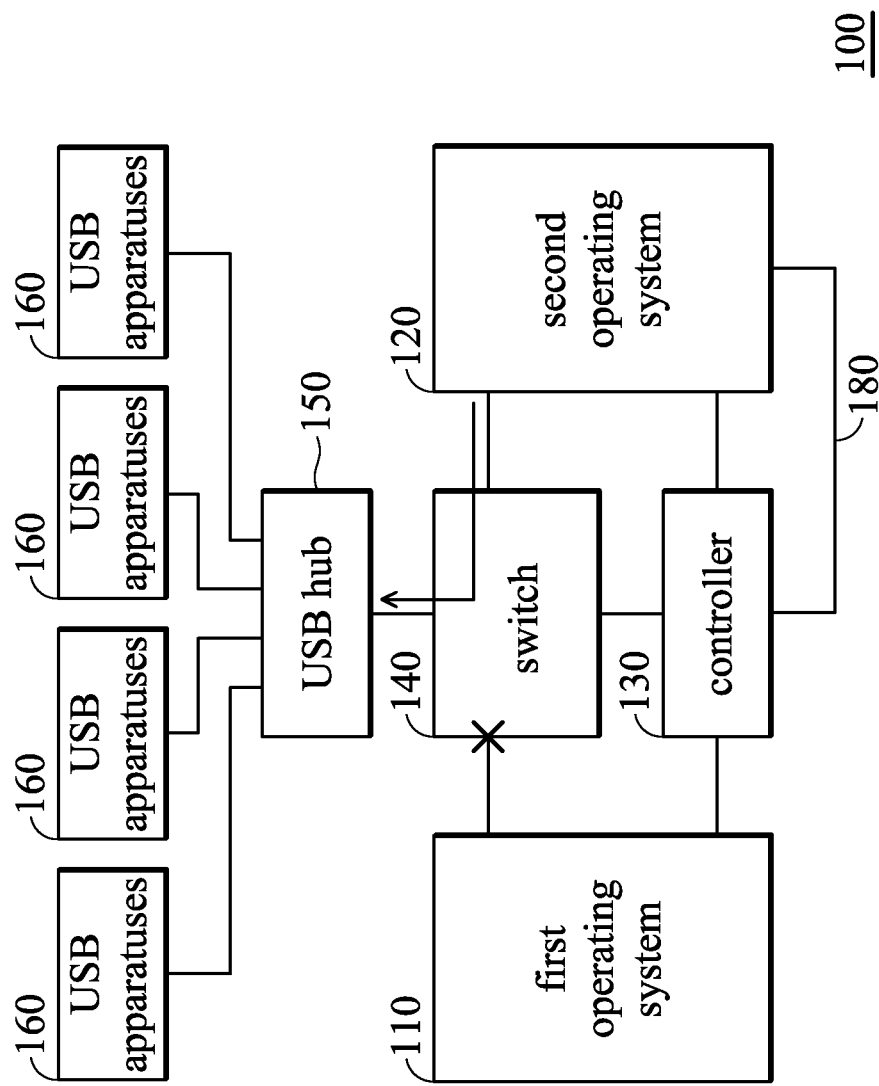
FIG. 1C is a dual-operating-system architecture according to a preferred embodiment of the present invention.

Further, in a preferred embodiment, the first operating system 110 and the second operating system 120 connect to each other not only indirectly via the controller 130, but also directly via the transmission interface 170 which is independent from the controller 130. For example, the transmission interface 170 is another USB interface. In this manner, the two operating systems 110 and 120 can communicate with each other so as to, for example, install programs and applications on, access data from, and synchronize data between each other. This can greatly reduce the possibility of conflicts occurring between the operating systems. The USB transmission interface 170 in the embodiments described above is merely for illustration, and can be replaced by other kinds of transmission interfaces in other embodiments. FIG. 1C is a dual-operating-system architecture according to a preferred embodiment of the present invention. In this embodiment, the controller 130 has a USB ID pin 180 connected to the second operating system 120 so that the second operating system 120 can switch between the host mode and the client mode by detecting the level changes on the USB ID pin 180.

Based on the dual-operating-system architecture, the present invention further provides a method for the dual-operating-system to share USB devices, which will be described in detail below.

Dual-Operating-System for Sharing USB Devices

Figure 2A:
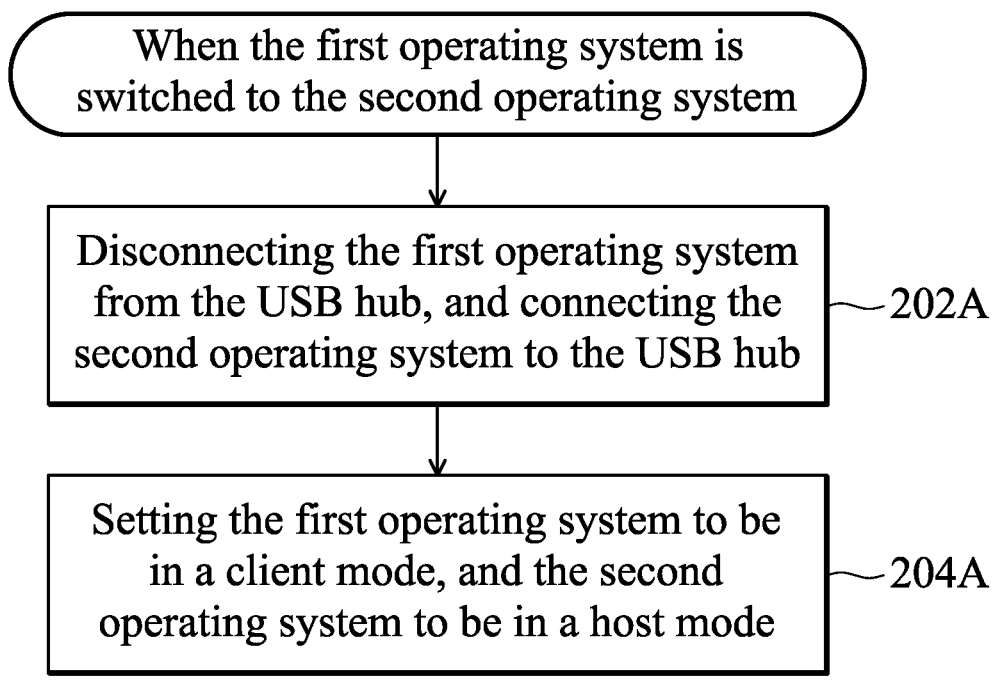
FIGS. 2A and 2B are flowcharts of the method for the dual-operating-system architecture to share USB devices according to an embodiment of the present invention.
Figure 2B:
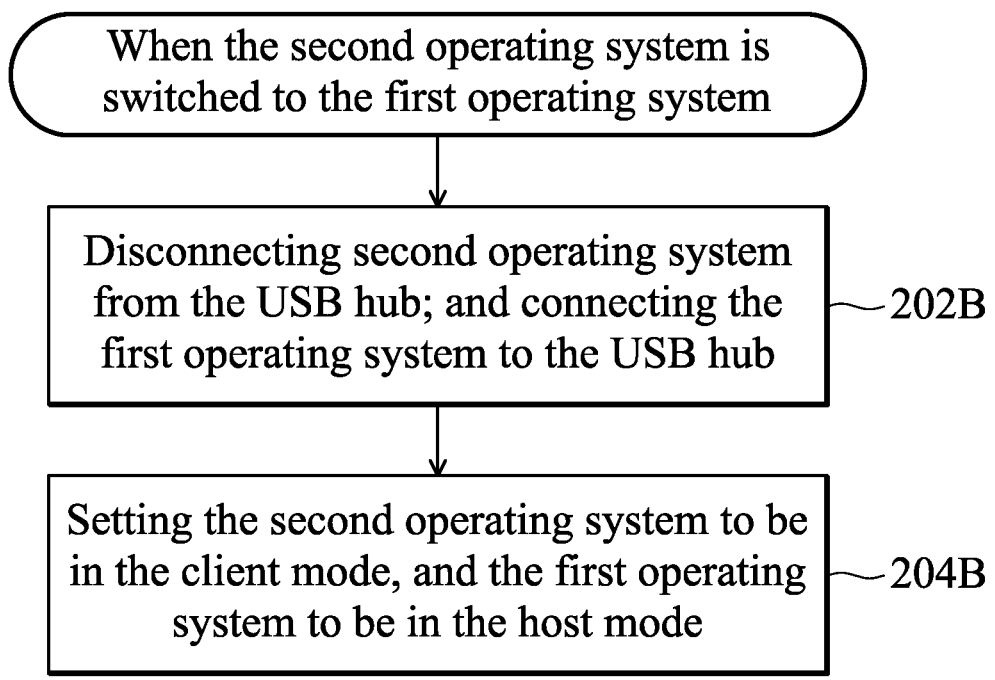

FIGS. 2A and 2B are flowcharts of the method for the dual-operating-system architecture to share USB devices according to an embodiment of the present invention. Please refer to FIGS. 1A, 1B and 1C. The methods 200A and 200B are performed for the dual-operating-system architecture 100 described previously, where the dual-operating-system architecture 100 comprises a first operating system 110, a second operating system 120, a controller 130, a switch 140 USB hub 150, and a plurality of USB devices 160 that connect to the USB hub 150. The methods 200A and 200B are mainly performed by the controller 130. The method 200A is performed at the time when the first operating system 110 is switched to the second operating system 120 due to, for example, the user pressing on a hardware or software button of a computer system or a smartphone. The method 200A comprises: disconnecting the first operating system 110 from the USB hub 150, connecting the second operating system 120 to the USB hub 150 to give the second operating system 120 control over the USB devices 160 (step S202A); and setting the first operating system 110 to be in a client mode, and the second operating system 120 to be in a host mode (step S204A), as shown in FIG. 2A. Similarly, the method 200B comprises: when the second operating system 120 is switched to the first operating system 110, disconnecting second operating system 120 from the USB hub 150; connecting the first operating system 110 to the USB hub 150 to make the first operating system 110 gain control over the USB devices 160 (step S202B); and setting the second operating system 120 to be in the client mode, and the first operating system 110 to be in the host mode (step S204B), as shown in FIG. 2B. Specifically, when the first operating system 110 is a Windows system in the host mode and the second operating system 120 is an Android system in the client mode, the Windows system can see the Android system as a peripheral device so as to install programs or applications on, access data from, and synchronize data for the Android system. The method of the present invention can help the dual-operating-system architecture share peripheral apparatuses, thus greatly improving the usage efficiency of the dual-operating-system architecture.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual-operating-system architecture for sharing USB apparatus, comprising:
 a first operating system;
 a second operating system, wherein the first and the second operating systems are integrated on a single electronic device;
 a USB hub, connected to at least one USB apparatus;
 a switch, for disconnecting the first operating system from the USB hub and connecting the second operating system to the USB hub for gaining control over the at least one USB apparatus when the first operating system is switched to the second operating system, and for disconnecting the second operating system from the USB hub and connecting the first operating system to the USB hub for gaining control over the at least one USB apparatus when the second operating system is switched to the first operating system; and
 a controller, coupled between the first operating system, the second operating system and the switch, wherein the controller is configured to control the switch and to set the first operating system to be in a client mode and the second operating system to be in a host mode when the first operating system is switched to the second operating system, and to control the switch and to set the first operating system to be in a host mode and the second operating system to be in a client mode when the second operating system is switched to the first operating system.

2. The dual-operating-system architecture for sharing USB apparatus as claimed in claim 1, further comprising a transmission interface, coupled between the first operating system and the second operating system, for transmitting data between the first operating system and the second operating system.

3. The dual-operating-system architecture for sharing USB apparatus as claimed in claim 2, wherein the transmission interface is independent from the controller.

4. The dual-operating-system architecture for sharing USB apparatus as claimed in claim 1, wherein the controller has a USB ID pin connected to the second operating system, and the second operating system switches between the host mode and the client mode by detecting level changes on the USB ID pin.

5. A method for a dual-operating-system architecture to share USB devices, wherein the dual-operating-system architecture comprises a first operating system and a second operating system integrated on a single electronic device, and the two operating systems are connected to each other, the method comprising the steps of:
 providing a USB hub to connect to at least one USB apparatus;

providing a switch to connect to the USB hub, the first operating system, and the second operating system;

disconnecting the first operating system from the USB hub and connecting the second operating system to the USB hub to make the second operating system gain control over the USB apparatus(es) when the first operating system is switched to the second operating system;

setting the first operating system to be in a client mode and the second operating system to be in a host mode when the first operating system is switched to the second operating system;

disconnecting the second operating system from the USB hub and connecting the first operating system to the USB hub to make the first operating system gain control over the USB apparatus(es) when the second operating system is switched to the first operating system; and setting the first operating system to be in a host mode and the second operating system to be in a client mode when the second operating system is switched to the first operating system.

6. The method as claimed in claim 5, further comprising:

providing a controller for controlling the connection among the switch, the first operating system, the second operating system and the USB hub.

7. The method as claimed in claim 6, wherein the controller has a USB ID pin connected to the second operating system, and the second operating system switches between the host mode and the client mode by detecting level changes in the USB ID pin.

* * * * *